(12) United States Patent
Lenox

(10) Patent No.: US 7,435,134 B2
(45) Date of Patent: Oct. 14, 2008

(54) PHOTOVOLTAIC MODULE MOUNTING CLIP WITH INTEGRAL GROUNDING

(75) Inventor: Carl J. Lenox, Oakland, CA (US)

(73) Assignee: Sunpower Corporation, Systems, Richmond, CA (US)

( * ) Notice: Subject to any disclaimer, the term of this patent is extended or adjusted under 35 U.S.C. 154(b) by 0 days.

(21) Appl. No.: 11/681,972

(22) Filed: Mar. 5, 2007

(65) Prior Publication Data

US 2007/0212935 A1   Sep. 13, 2007

Related U.S. Application Data

(60) Provisional application No. 60/821,869, filed on Aug. 9, 2006, provisional application No. 60/780,819, filed on Mar. 9, 2006.

(51) Int. Cl.
*H01R 13/60* (2006.01)
(52) U.S. Cl. ..................... 439/567; 52/173.3
(58) Field of Classification Search ................ 439/567, 439/562, 564, 565; 52/173.3; D8/349, 394
See application file for complete search history.

(56) References Cited

U.S. PATENT DOCUMENTS

| 1,893,481 | A | | 1/1933 | Adams |
|---|---|---|---|---|
| 4,233,085 | A | * | 11/1980 | Roderick et al. ............ 136/244 |
| 5,571,338 | A | | 11/1996 | Kadonome et al. |
| 6,360,491 | B1 | * | 3/2002 | Ullman ......................... 52/22 |
| 6,672,018 | B2 | | 1/2004 | Shingleton |
| 6,962,591 | B2 | | 11/2005 | Lerch et al. |
| 2004/0000334 | A1 | | 1/2004 | Ressler |
| 2006/0042683 | A1 | | 3/2006 | Gangemi |

OTHER PUBLICATIONS

Smith Electric Company: May 2004; http://msmith.typepad.com/smithelectricco/2004/05/index.html.*
http://store.altenergystore.com/Solar-Panels/150-Watts-Up-Solar-Panels/Sharp-NT-175U1-175W-24V-Solar-Panel/p1073/?source=froogle.*
Sanyo Type Clip Drawings; Nov. 2005, 2 pp.
International Search Report and Written Opinion for PCT/US07/63325 mailed on Feb. 27, 2007.

* cited by examiner

*Primary Examiner*—Renee S Luebke
*Assistant Examiner*—Vanessa Girardi
(74) *Attorney, Agent, or Firm*—James F. Hann; Haynes Beffel & Wolfeld LLP

(57) ABSTRACT

An electrically conductive mounting/grounding clip, for use with a photovoltaic assembly of the type having an electrically conductive frame, comprises an electrically conductive body. The body has a central portion and first and second spaced-apart arms extending generally perpendicular to the central portion. Each arm has an outer portion with each outer portion having an outer end. At least one frame surface-disrupting element is at each outer end. The central portion defines a plane with the frame surface-disrupting elements pointing towards the plane. In some examples each arm extends from the central portion at an acute angle to the plane.

9 Claims, 6 Drawing Sheets

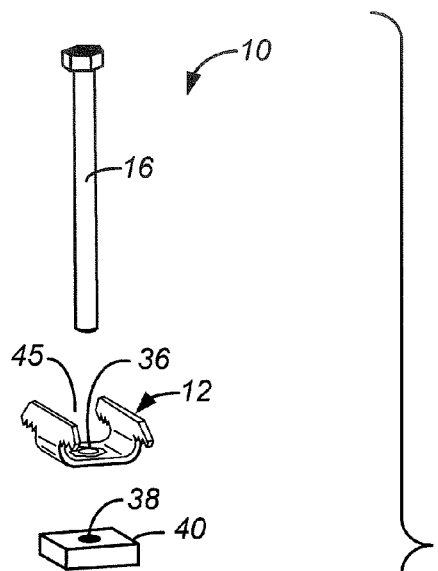
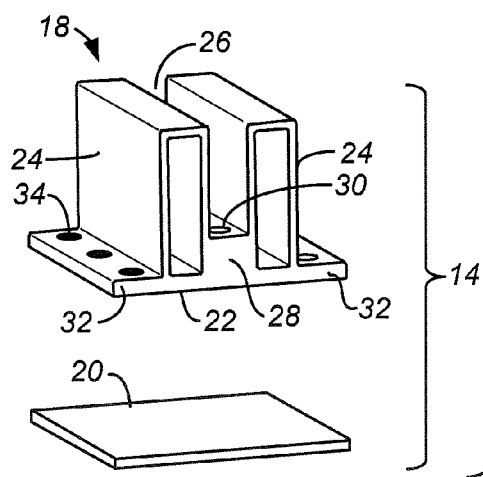
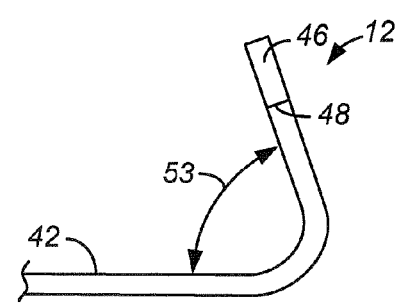
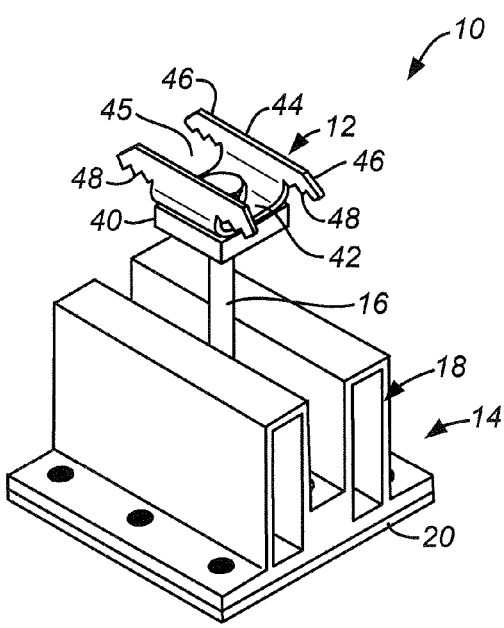
FIG. 1
FIG. 1A
FIG. 2

PHOTOVOLTAIC MODULE MOUNTING CLIP WITH INTEGRAL GROUNDING

CROSS-REFERENCE TO OTHER APPLICATIONS

This application claims the benefit of provisional patent application No. 60/780,819 filed on 9 Mar. 2006, and provisional patent application No. 60/821,869 filed on 9 Aug. 2006, the disclosures of which are incorporated by reference.

STATE SPONSORED RESEARCH OR DEVELOPMENT

This invention was made with State of California support under California Commission Agreement Number 500-04-022. The Energy Commission has certain rights to this invention.

BACKGROUND OF THE INVENTION

This invention generally relates to the mounting of framed photovoltaic (PV) modules atop roofs and other support structures, where positive mechanical securement of the modules to the supporting base or structure is desirable and electrical grounding of accessible metal components, such as the PV module frame and ancillary mounting components, is required. Known combined mounting/grounding devices require a special flange on the outside of the photovoltaic module frame and a specially designed clip or other attachment device. Therefore, conventional combined mounting/grounding devices are limited to use with specific module frame geometries.

BRIEF SUMMARY OF THE INVENTION

A first example of an electrically conductive mounting/grounding clip, for use with PV assemblies of the type having electrically conductive frames separated by gaps, comprises an electrically conductive body having a central portion and first and second spaced-apart arms extending generally perpendicular to the central portion. Each arm has an outer portion, each outer portion having first and second outer ends. The clip also has a frame surface-disrupting element at each outer end. The central portion defines a plane. The frame surface-disrupting elements point towards the plane. In some examples the frame surface-disrupting elements comprise frame-surface-penetrating teeth. In some examples each arm extends from the central portion at an acute angle to the plane, such as 80-88°.

A second example of an electrically conductive mounting/grounding clip, for use with an array of PV assemblies of the type having electrically conductive frames separated by gaps, includes an electrically conductive body. The body comprises a central portion and first and second spaced-apart, generally T-shaped arms extending from the central portion. Each arm extends from the central portion at an acute angle to the plane. Each arm has an outer portion, each outer portion having first and second outer ends. A plurality of frame surface-disrupting elements are at each outer end. The frame surface-disrupting elements of each arm are oriented in a direction generally parallel to a line connecting the outer ends of said arm. The central portion defines a plane and the frame surface-disrupting elements point towards the plane.

An example of an electrically conductive mounting/grounding clip assembly, for use with an array of PV assemblies of the type having electrically conductive frames separated by gaps, includes an electrically conductive clip and a second member. The clip includes a central portion and first and second spaced-apart arms extending generally perpendicular to the central portion. Each arm has an outer portion and each outer portion has first and second outer ends. A frame surface-disrupting element is it each outer end. The central portion defines a plane and the frame surface-disrupting elements point towards the plane. The clip assembly also includes means for (1) biasing the frame surface-disrupting elements of the clip against electrically conductive frames of adjacent PV assemblies thereby electrically connecting the frames to one another through the clip, and (2) securing the clip to the second member.

An example of a PV installation includes a support, first and second PV assemblies and an electrically conductive mounting/grounding clip assembly for use with the first and second PV assemblies. The first and second PV assemblies are of the type having electrically conductive frames separated by a gap, the frames each having an upper surface. The clip assembly comprises an electrically conductive clip. The clip includes a central portion and first and second spaced-apart, generally T-shaped arms extending generally perpendicular to the central portion. The central portion and arms define an access region accessible from above. Each arm has an outer portion, each outer portion having first and second outer ends. At least one frame surface-disrupting element is at each outer end. The central portion defines a plane. The clip assembly also includes a second member, positioned generally beneath the first and second PV assemblies and supported by the support, and an elongated connection member. The elongated connection member secures the clip to the second member and is extendable within the gap between the electrically conductive frames so that the frame-disrupting element can be forced against the electrically conductive frames thereby electrically connecting the frames to one another through the clip. The central portion comprises a hole and the elongated connection member comprises a connection element passing through the hole. The connection element has an upper end located completely within the access region and below the upper surface. In some examples the frame comprises an electrically non-conductive surface and the frame surface-disrupting portion comprises surface-penetrating teeth. In some examples the clip assembly further comprises means for preventing the clip from tipping away from the frame as the clip is biased against the frame by the elongated connection member. In some examples the connection element may include a threaded member, such as a bolt or a stud.

A third example of an electrically conductive mounting/grounding clip, for use with a PV assembly of the type having an electrically conductive frame, comprises an electrically conductive body. The body has a central portion and first and second spaced-apart arms extending generally perpendicular to the central portion. Each arm has an outer portion with each outer portion having an outer end. A plurality of frame surface-disrupting elements are at each outer end. The central portion defines a plane with the frame surface-disrupting elements pointing towards the plane. In some examples each arm extends from the central portion at an acute angle to the plane.

A second example of an electrically conductive mounting/grounding clip assembly, for use with a PV assembly of the type having electrically conductive frame, includes an electrically conductive clip and a second member. The clip comprises a central portion and first and second spaced-apart arms extending from the central portion. Each arm has an outer portion with each outer portion having an outer end. A frame surface-disrupting element is it each outer end. The central portion defines a plane and the frame surface-disrupting elements point towards the plane. The clip assembly also includes means for (1) biasing the frame surface-disrupting elements of the clip against the electrically conductive frame of an adjacent PV assembly thereby electrically connecting the frame to the clip, and (2) securing the clip to the second member. The clip assembly further includes means for preventing the clip from tipping away from the frame as the clip is biased against the frame by the biasing and securing means.

A second example of a PV installation comprises a support, a PV assembly and an electrically conductive mounting/grounding clip assembly for use with the PV assembly. The PV assembly is of the type having an electrically conductive frame, the frame having an upper surface. The clip assembly comprises an electrically conductive clip. The clip comprises a central portion and first and second spaced-apart arms extending generally perpendicular to the central portion. The central portion and arms define an access region accessible from above. Each arm has an outer portion with each outer portion having an outer end. At least one frame surface-disrupting element is at each outer end. The central portion defines a plane. The frame surface-disrupting element points towards the plane. The clip assembly also includes a second member positioned generally beneath the PV assembly and supported by the support. The clip assembly further includes an elongated connection member securing the clip to the second member so that the frame-disrupting element can be forced against the electrically conductive frame thereby electrically connecting the frame to the clip. The central portion has a hole and the elongated connection member comprises a connection element passing through the hole. The connection element has an upper end located completely within the access region and below the upper surface. The clip assembly further includes means for preventing the clip from tipping away from the frame as the clip is biased against the frame by the elongated connection member.

Various advantages, discussed below, accrue through the use of different examples of the invention. The clip assemblies can provide both a mounting and electrical grounding function. This saves considerable material and labor costs as compared to the conventional approach of running a grounding wire between all PV modules. The clips are can also be less expensive than typical tinned copper grounding lugs. The clips can be easily secured to the modules from above, unlike approaches which require the use of mounting and grounding holes in the module frame; such holes have limited accessibility, especially after installation. This reduces installation and maintenance costs. The clip assembly can be module neutral; that is, it can be used on any framed PV module in which at least portions of the frame are electrically conductive for grounding the PV module. Examples of the invention also do not require any special construction of the module frame, such as external flanges specific to a particular module manufacturer. The geometry of the clip assembly can comprise a direct connection for grounding as required by Underwriters Laboratories (UL) as opposed to some other approaches, where the grounding points are not directly connected to the module frame by the mounting bolt or stud. Some examples of the clip assembly are amenable to use as a grounding device independently from its function as a mounting device, if desired.

Other features, aspects and advantages of the present invention can be seen on review of the figures, the detailed description, and the claims which follow.

BRIEF DESCRIPTION OF THE DRAWINGS

FIG. 1 is an exploded isometric view of a clip assembly;
FIG. 1A is an enlarged partial side view of the clip of FIG. 1;
FIG. 2 is an assembled isometric view of the clip assembly of FIG. 1.

DETAILED DESCRIPTION OF THE INVENTION

Figure 3:
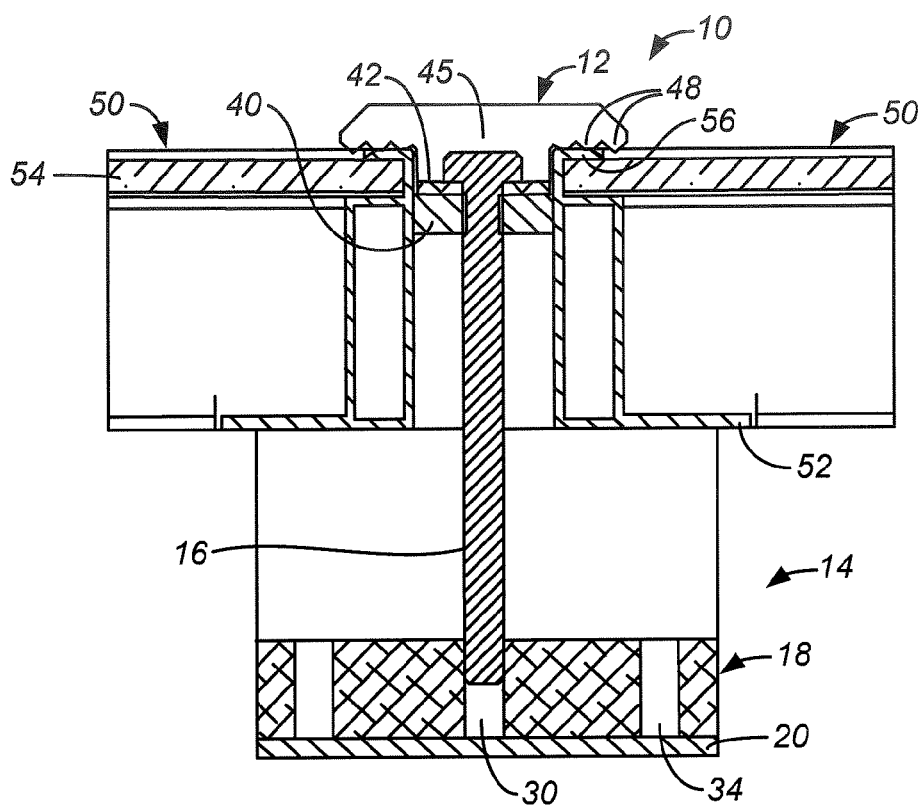
FIG. 3 is an enlarged cross-sectional view of the clip assembly of FIG. 2 shown secured to adjacent PV assemblies.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

FIG. 1 is an exploded isometric view of one example of a clip assembly 10 made according to the invention. Assembly 10 includes a clip 12 secured to a second member 14 by a bolt 16. Second member 14 includes a base 18, typically of extruded aluminum or some other appropriate material, and a sealant 20 secured to the lower surface 22 of base 18. Sealant 20 is typically in the form of a butyl tape about 3 mm thick. Base 18 has a pair of raised portions 24 defining a gap 26 therebetween. Gap 26 extends down to a central region 28 of base 18, central region 28 having a number of threaded holes 30 formed therein for receipt of bolt 16. Base 18 also has a pair of flanges 32 having a number of mounting holes 34 used to secure second member 14 to a mounting surface, such as a roof. Bolt 16 passes through a central opening 36 in clip 12, through a hole 38 formed in a spacer 40, through gap 26, and into a threaded hole 30. Other types and configurations for base 18, such as that shown in provisional patent application No. 60/821,869, may also be used.

Figure 4:
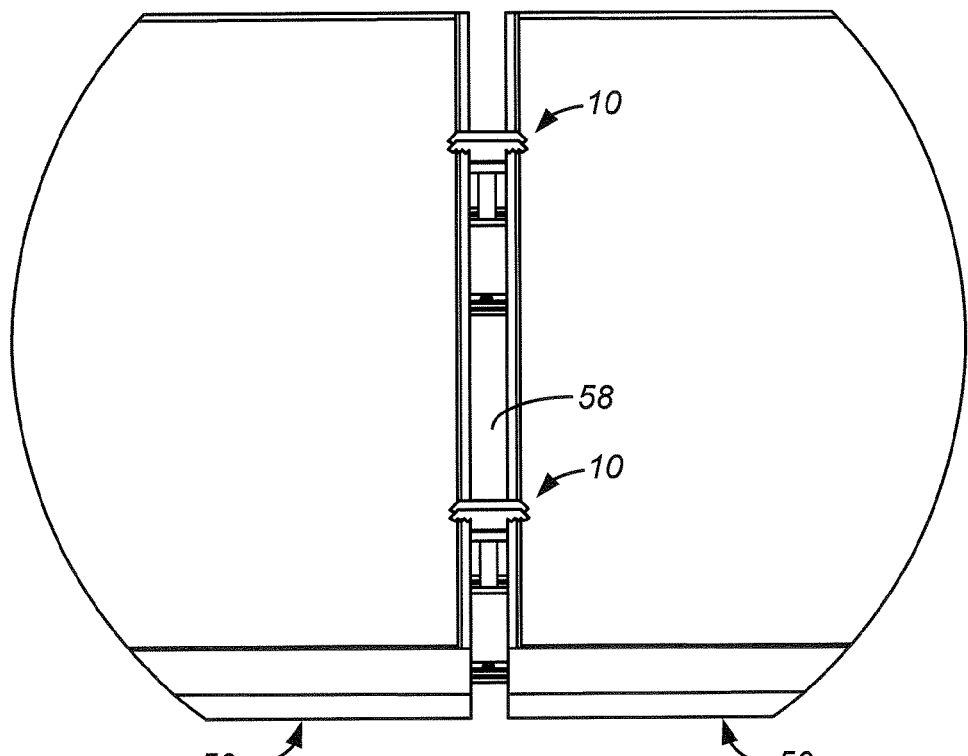
FIG. 4 is a simplified overall view of two adjacent PV assemblies secured to one another using the clip assembly FIGS. 1-3.

FIG. 2 shows clip assembly 10 in an assembled form while FIG. 3 illustrates clip assembly 10 of FIG. 2 securing adjacent PV assemblies to second member 14. FIG. 4 is a simplified overall view illustrating two clip assemblies 10 engaging adjacent PV assemblies 50 in the gap 58 between the PV assemblies. Clip assemblies 10 are commonly referred to as interior clip assemblies when used between adjacent PV assemblies.

Clip 12 is a generally U-shaped structure having a central portion 42, through which central opening 36 is formed, and a pair of upstanding arms 44. Arms 44 and central portion 42 define an access region 45. Access region 45 is accessible from above to provide clear access to bolt 16 thus facilitating the use of clip assembly 10. Arms 44 include extensions 46 having downwardly extending teeth 48. As shown in FIG. 3, clip assembly 10 is used with PV assemblies 50 of the type having electrically conductive frames 52 surrounding PV panels 54. As can be seen in FIGS. 2 and 3, the head of bolt 16 is located completely within access region 45 and is located below the top surface of frame 52 of PV assembly 50. In addition, the generally T-shaped configuration of arms 44 with downwardly facing teeth 48 provide for a low profile structure. This low profile structure creates a cleaner, less cluttered appearance and also minimizes shading of PV panel 54.

Frames 52 have an upper, circumferentially extending edge 56 which are engaged by teeth 48 of clip 12. Frame 52 is typically anodized aluminum and thus has a non-conductive outer surface. Frame 52 may also have other types of non-conductive outer surfaces, such as a painted outer surface. To ensure good electrical contact between clip 12 and frame 52, teeth 48 act as surface-disrupting elements. The serrated teeth or other structure cuts through any nonconductive material on frame 52 thereby creating a positive electrical connection with clip 12, and via bolt 16, to second member 14. This helps to ensure good grounding between frames 52 of adjacent PV assemblies 50 through clip 12. Other surface-disrupting methods could also be used, such as causing clip 12 to slide against and score a portion of frame 52 or through the use of other types of surface-disrupting structures or procedures.

In the example of FIGS. 1-3, three teeth 48 are used at each extension 46 of arms 44. The use of a number of points 44 at each extension 46 allows some adjustment in the position of clip 12 relative to frame 52, thus facilitating installation. Teeth 48 are oriented to be generally parallel to a line connecting extensions 46 of each arm 44 and thus generally perpendicular to the adjacent frame 52.

Arms 44 are preferably not perpendicular to central portion 42. In the disclosed example, arms 44 extend inwardly over central portion 42 to define an included angle 53, see FIG. 1A. Included angle 53 is an acute angle and typically ranges from 80-88°, and is about 83° in the disclosed example. This helps to strengthen clip 12 because arms 44 will tend to straighten out under load. Another advantage with the angulation of arms 44 is that doing so results in more of a point contact by teeth 48 with frame 52. This can be for two primary reasons. The first reason is that teeth 48, for practical purposes, do not narrow down to a true point but rather to a line or edge, the length of which is as long as clip 12 is thick. Therefore, by angling arms 44, the ends of teeth 48 first engage frame 52 to provide more of a point contact than a line contact. The second reason is based upon the fact that manufacturing constraints limit how sharp of an edge teeth 48 will exhibit. In some examples, teeth 48 will exhibit a rounded edge so that if arms 44 were perpendicular to central portion 42, teeth 48 would provide a generally cylindrical surface against frame 52.

Clip 12 also secures frame 52 to second member 14 by capturing the frame between arms 44 of clip 12 and raised portions 24 of base 18. Spacer 40, as suggested in FIG. 3, helps to ensure adjacent PV assemblies 50 are located in a proper distance from one another. Spacer 40 is typically made of rubber or some other material including, for example, metal or cardboard, sized to be larger than the width of central portion 42, illustrated in FIG. 3. The size of spacer 40 is chosen so that when PV assemblies 50 expand during hot weather, or otherwise, PV assemblies 50 have room to expand before contacting clip 12. This helps to prevent damage to PV panels 54, which could occur if PV assemblies 50 were to press directly against clip 12 during such thermal expansion. The use of spacer 40 simplifies installation and by eliminating the need to use a special tool to ensure proper spacing of PV assemblies during installation. Although the primary grounding created by clip 12 is from frame 52 of one PV assembly 50 to frame 52 of an adjacent PV assembly, clip assembly 10 can also be used to provide grounding between PV assembly frames 52 and second member 14.

Clip assembly 10 provides a low profile mounting/grounding clip assembly usable with a wide variety of PV assemblies of the type having an electrically conductive circumferential frame having an exposed upper peripheral surface.

Figure 5:
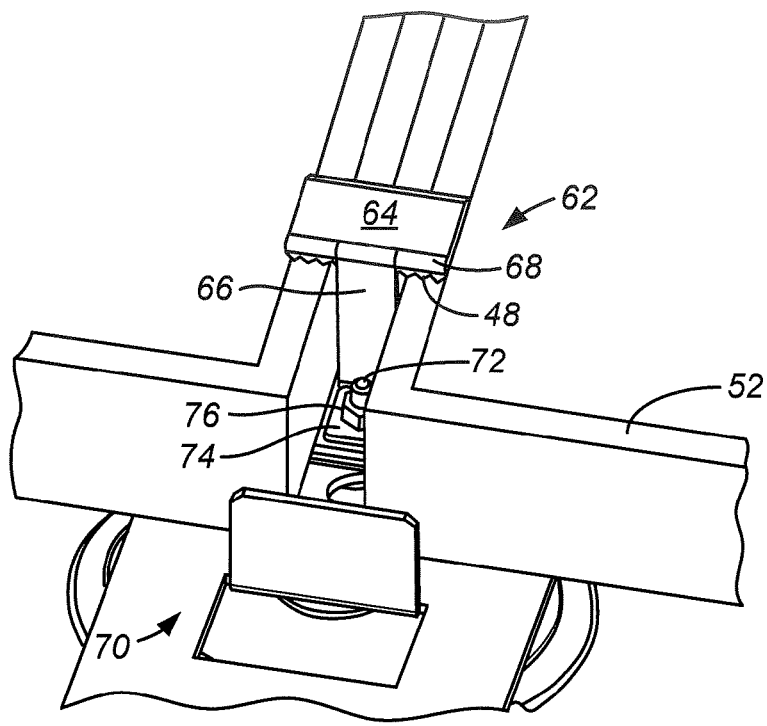
FIGS. 5-8 illustrate different types of clip assemblies used with different types of support structures.

FIG. 5 illustrates a clip assembly 62 that uses a clip 64 similar to clip 12 but turned upside down with teeth 48 facing the opposite direction so that they also pointed downwardly to engage frame 52 of PV assemblies 50. In addition, instead of using a central bolt 16, clip assembly 62 has a pair of L-shaped legs 66 extending downwardly from the arms 68 of clip 64. Second member 70 in this example has an upwardly extending stud 72 passing through a hole, not shown, formed in the bent end 74 of each leg 66 with a nut 76 securing leg 66 to second member 70.

Figure 6:
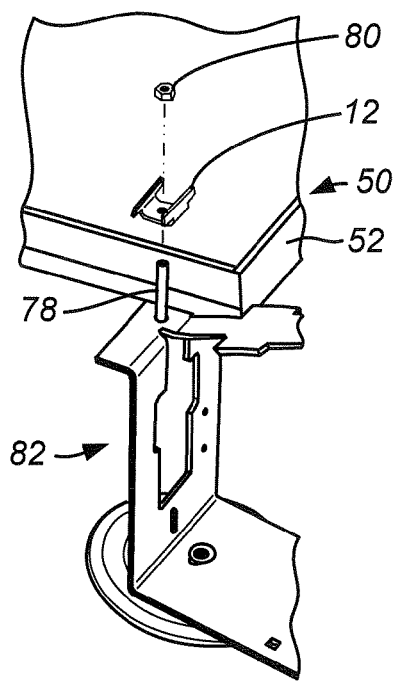
Figure 7:
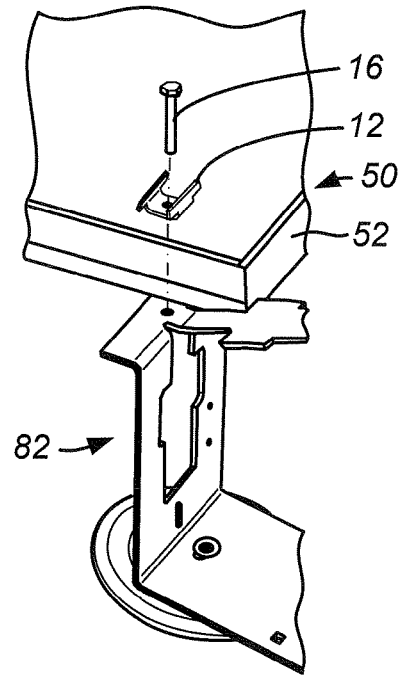

FIGS. 6 and 7 disclose further alternative embodiments similar to the embodiment of FIGS. 1-4, with a stud-type mount in FIG. 6 including a stud 78 and a nut 80 and a bolt type mount in FIG. 7, and a different type of second member 82 supporting PV assemblies 50. The second members supporting PV assemblies 50 in FIGS. 5-7 are used to support sloped PV assemblies. This type of structure is shown in more detail in U.S. patent application Ser. No. 11/616,575, filed 27 Dec. 2006, entitled Supported PV Module Assembly, the disclosure of which is incorporated by reference.

Figure 8:
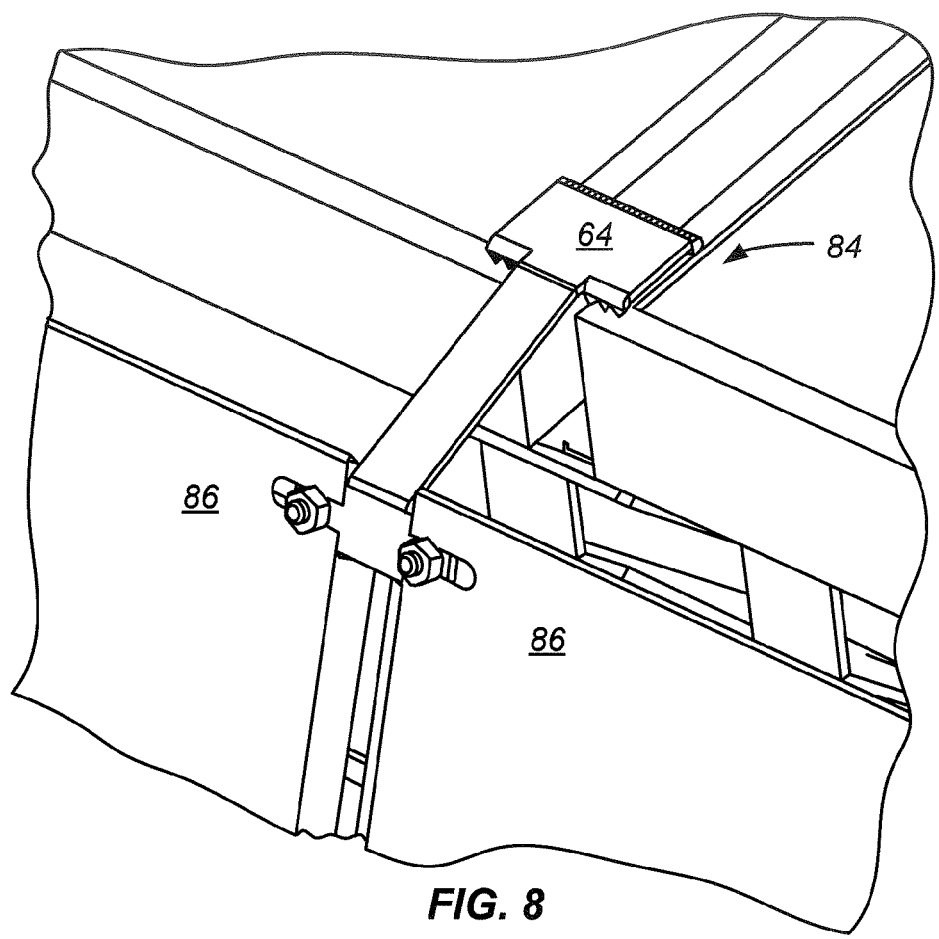

FIG. 8 shows a still further embodiment in which clip assembly 84 includes a clip 64 connected to a pair of wind deflectors 86. Wind deflectors 86 may be of the type shown in the above referenced U.S. patent application Ser. No. 11/616, 575. Clip assembly 84 also includes an L-shaped leg, not shown but similar to L-shaped leg 66 of FIG. 5, to provide an electrical ground connection and a hold down or support function for PV assemblies 50. A clip assembly can also be constructed to provide securement point(s) for other photovoltaic array components, such as a ballast pan, a visual shield, a fire shield, a wire tray or wire securement device, or a structural member. The securement points(s) may consist of a mounting hole, a threaded stud, or a snap fit device. A clip assembly can also provide an attachment point for a conventional grounding lug or grounding wire. A particular securement point may also act as both a structural point and grounding point. Unlike clip assembly 10, clip assembly 62, 84 of FIGS. 5 and 8 are most useful for use with PV assemblies 50 having frames 52 of a chosen height.

Figure 9:
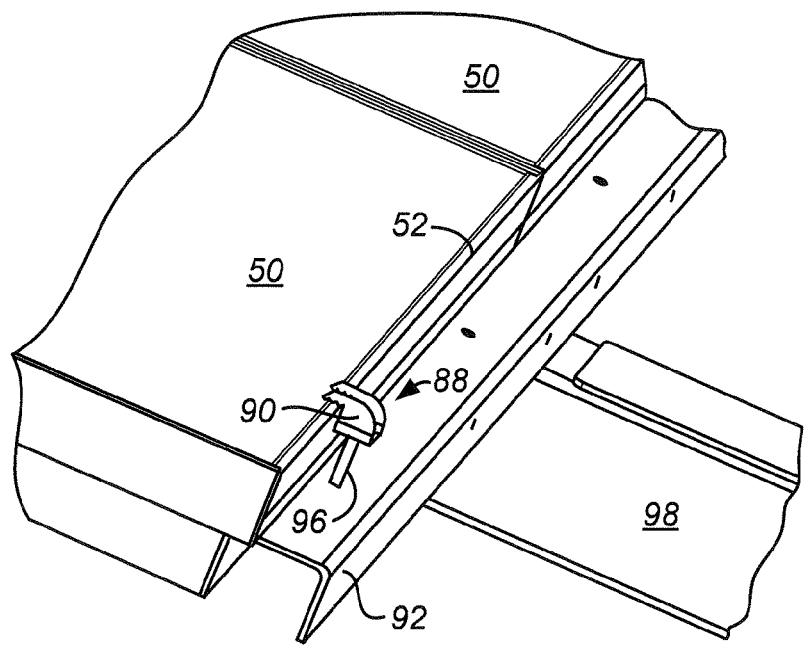
FIG. 9 is an overall view of a peripheral clip assembly.
Figure 10:
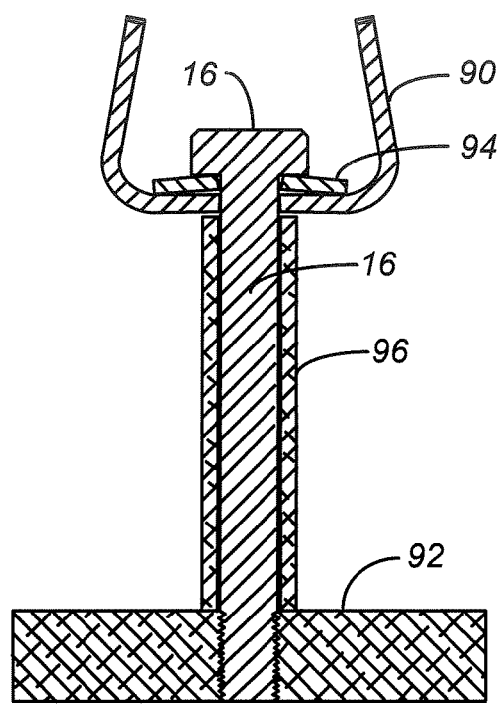
FIG. 10 is a cross-sectional view of the clip assembly of FIG. 9.

FIGS. 9 and 10 illustrate what is sometimes called a peripheral clip assembly 88. Unlike clip assemblies 10, 62 and 84, a peripheral clip assembly 88 is used to securely mount PV assembly 50 and may be used to ground frame 52 to a support member. Similar types of installations are shown in U.S. Pat. Nos. 6,058,930 and 6,722,357, the disclosures of which are incorporated by reference. In this embodiment perimeter clip 90 is secured to second member 92 using a bolt 16, an optional washer 94, and a standoff 96. The length of standoff 96 is determined by the height of frame 52. Standoff 96 helps to prevent perimeter clip 90 from tipping away from frame 52 when bolt 16 is tightened. Other types of spacers may also be used for this purpose. Bolt 16 grounds frame 52 to second member 92, which in this embodiment is a laterally-extending support mounted to a torque tube 98 of a tilted, tracking solar collector assembly. In this case frames 52 of a row of PV assemblies 50 are grounded to one another through second member 92 and, optionally, to other rows of PV assemblies through torque tube 98 and other second members 92.

Figure 11:
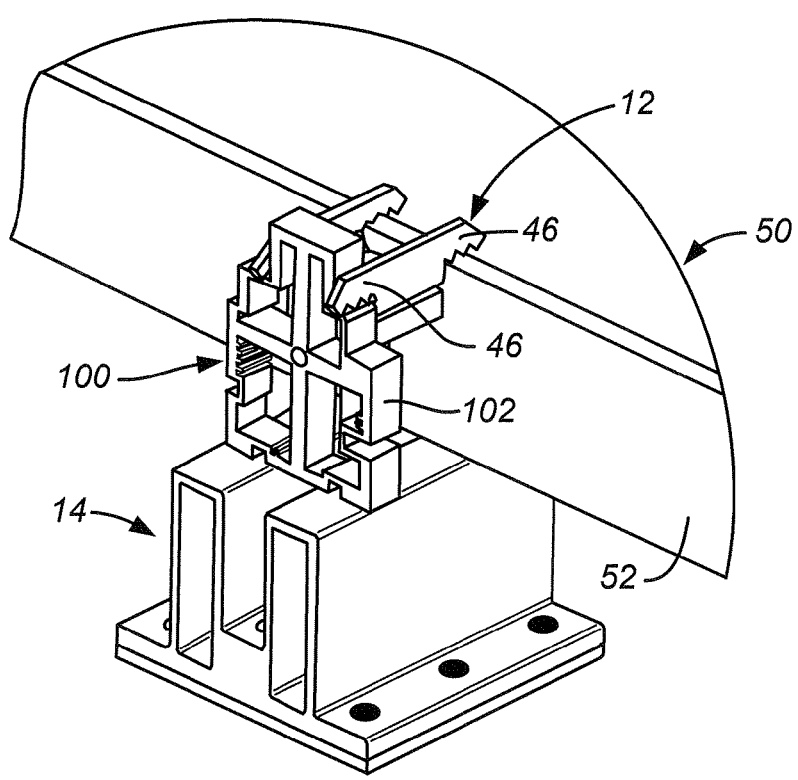
FIG. 11 shows a clip assembly of FIGS. 1 and 2 used at the periphery of a PV array with a spacer.

Clip assembly 10 of FIGS. 1 and 2 can be used at the periphery by using, for example, a spacer 100 located between the otherwise unused extensions 46 of clip 12, see FIG. 11, and the second member 14. Spacer 100 has a periphery 102 configured to accommodate frames 52 having different heights. Other types of variable-height of spacers, including threaded, telescoping spacers and spacers consisting of stacks of individual spacer elements, can also be used.

Figure 12:
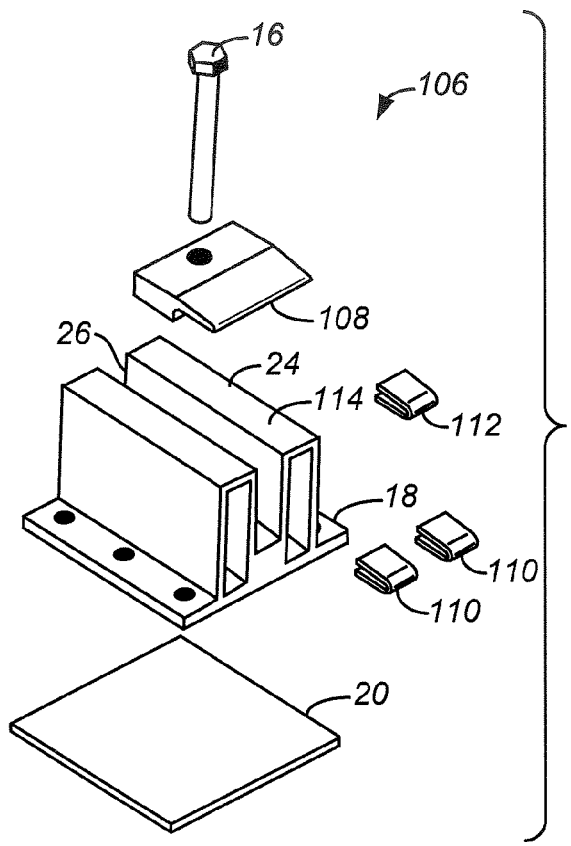
FIGS. 12 and 13 are exploded isometric and isometric views of an internal clip assembly.
Figure 13:
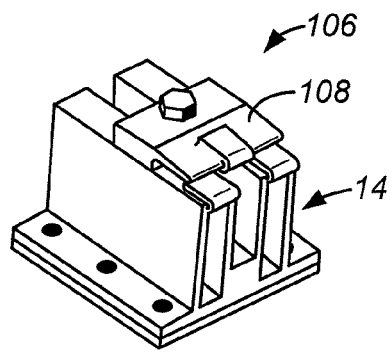
Figure 14:
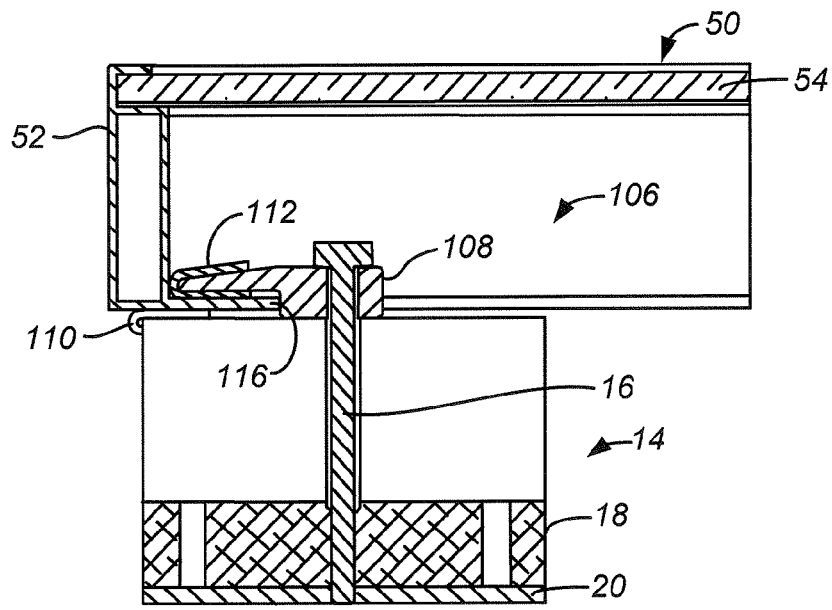
FIG. 14 is a cross-sectional view showing the clip assembly of FIG. 13 secured to the internal lip of the frame of a PV assembly.

FIGS. 12-14 illustrate an internal clip assembly 106 designed as a modification of clip assembly 10 of FIGS. 1 and 2. Clip assembly 106 includes a clip 108 and pieces of electrically insulating adhesive-backed tape 110, 112. Tape 110 is secured to raised portions 24 of base 18 to cover the end of upper surface 114 opposite clip 108. Tape 112 is adhered to clip 108 as shown in FIGS. 12 and 13 to lie above gap 26. Bolt 16 is tightened onto base 18 and then PV assembly 50 is secured to clip assembly 106 by sliding an internal lip 116 of frame 52 between clip 108 and base 18 engaging insulating tape 110, 112. In this example internal clip assembly 106 acts to secure PV assembly 50 in place but does not provide a grounding function. In other examples internal clip assembly 106 could be configured to provide a grounding function as well as a mounting function by, for example, causing a spike to pierce the surface of lip 116 when the lip is inserted between clip 108 and base 18. Tape 110, 112 helps to ensure the snug engagement of lip 116 between clip 108 and base 18 and also helps to reduce marring of the surface of lip 116. Although tape 110, 112 is in this example electrically insulating, it need not be.

The above-described embodiments have a clip assembly supported by a support. The support is typically a commercial or residential roof or support frame member for a solar energy tracking system. The support can also include trellises, carports, shade structures, and so forth. The clip assembly can also be supported directly on the ground.

The clip assembly is preferably designed to withstand uplift and lateral loads as appropriate for the application. The clip materials are chosen for required strength, corrosion resistance, and aesthetics.

During installation the mounting bolt may be torqued such that the threaded member and the clip are pre-loaded above the maximum code wind load plus an appropriate safety factor. This ensures a secure mechanical and electrical connection in all field conditions and excludes moisture from the ground bond area at teeth 48 by creating a high pressure connection zone around each point.

The use of threaded connections has been emphasized. However, other types of connections, such as a ratchet-type of connections and connections using spring fingers, may also be used.

The above descriptions may have used terms such as above, below, top, bottom, over, under, et cetera. These terms are used to aid understanding of the invention are not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. Any and all patents, patent applications and printed publications referred to above are incorporated by reference.

What is claimed is:

1. An electrically conductive mounting/grounding clip for use with photovoltaic (PV) assemblies of a type having electrically conductive frames separated by gaps, the clip comprising:
   an electrically conductive body comprising a central portion and first and second spaced-apart arms extending generally perpendicular to the central portion;
   each arm having an outer portion, each outer portion having first and second outer ends;
   a frame surface-disrupting element at each outer end;
   the central portion defining a plane;
   each arm extending from the central portion at an acute angle to the plane; and
   the frame surface-disrupting elements pointing towards the plane.

2. The clip according to claim 1 wherein the frame surface-disrupting elements comprise frame-surface-penetrating teeth.

3. The clip according to claim 1 wherein the arms are generally T-shaped.

4. The clip according to claim 1 wherein the acute angle is 80-88°.

5. The clip according to claim 1 wherein the acute angle is about 83°.

6. The clip according to claim 1 further comprising a plurality of said frame surface-disrupting elements at each outer end.

7. The clip according to claim 6 wherein the frame surface-disrupting elements of each arm are oriented in a direction generally parallel to a line connecting the outer ends of said arm.

8. An electrically conductive mounting/grounding clip for use with photovoltaic (PV) assemblies of a type having electrically conductive frames separated by gaps, the clip comprising:
   an electrically conductive body comprising a central portion and first and second spaced-apart, generally T-shaped arms extending from the central portion;
   each arm extending from the central portion at an acute angle to the plane;
   each arm having an outer portion, each outer portion having first and second outer ends;
   a plurality of frame surface-disrupting elements at each outer end;
   the frame surface-disrupting elements of each arm being oriented in a direction generally parallel to a line connecting the outer ends of said arm; and
   the central portion defining a plane and the frame surface-disrupting elements pointing towards the plane.

9. An electrically conductive mounting/grounding clip assembly for use with a photovoltaic (PV) assembly of a type having electrically conductive frame, the clip assembly comprising:
   an electrically conductive clip comprising:
      a central portion and first and second spaced-apart arms extending from the central portion;
      each arm having an outer portion, each outer portion having an outer end;
      a frame surface-disrupting element at each outer end;
      the central portion defining a plane and the frame surface-disrupting elements pointing towards the plane; and
      each arm extending from the central portion at an acute angle to the plane;
   a second member supportable by a support element;
   means for (1) biasing the frame surface-disrupting elements of the clip against the electrically conductive frame of an adjacent PV assembly thereby electrically connecting the frame to the clip, and (2) securing the clip to the second member;
   means for preventing the clip from tipping away from the frame as the clip is biased against the frame by the biasing and securing means.

* * * * *